United States Patent [19]

Kimura et al.

[11] Patent Number: 5,195,036
[45] Date of Patent: Mar. 16, 1993

[54] SHIFT CONTROL SYSTEM AND METHOD FOR AUTOMATIC TRANSMISSION, INCLUDING ENGAGEMENT TIME LAG CONTROL

[75] Inventors: Hiromichi Kimura; Kunihiro Iwatsuki; Hideaki Otsubo, all of Toyota; Yukihiro Kobayashi, Obu; Kazunori Ishikawa, Toyota; Takuji Taniguchi, Okazaki, all of Japan

[73] Assignees: Aisin AW Co., Ltd., Anjo; Toyota Jidosha Kabushiki Kaisha, Toyota, both of Japan

[21] Appl. No.: 577,742

[22] Filed: Sep. 5, 1990

[30] Foreign Application Priority Data

Sep. 6, 1989 [JP] Japan ................................ 1-231084

[51] Int. Cl.$^5$ .............................................. B60K 41/06
[52] U.S. Cl. .................................. 364/424.1; 74/866; 74/869
[58] Field of Search ................ 364/424.1; 74/866, 867, 74/868, 869

[56] References Cited

U.S. PATENT DOCUMENTS

| 4,622,866 | 11/1986 | Ito et al. ................................ 74/866 |
| 4,640,393 | 2/1987 | Nishimura et al. .............. 192/0.052 |
| 4,688,450 | 8/1987 | Hayashi et al. ...................... 74/866 |
| 4,690,017 | 9/1987 | Taniguchi et al. ................... 74/866 |
| 4,700,591 | 10/1987 | Yasue et al. ........................ 74/866 |
| 4,709,596 | 12/1987 | Boda et al. ......................... 74/868 |
| 4,727,772 | 3/1988 | Sumiya et al. ...................... 74/867 |
| 4,730,519 | 3/1988 | Nakamura et al. ................... 74/866 |
| 4,789,937 | 12/1988 | Yasue et al. ..................... 364/424.1 |
| 4,790,215 | 12/1988 | Hamano ............................. 74/866 |
| 4,796,490 | 1/1989 | Butts .................................. 74/866 |
| 4,942,530 | 7/1990 | Boda et al. ...................... 364/424.1 |
| 4,955,256 | 9/1990 | Kashihara et al. ................... 74/866 |
| 4,967,355 | 10/1990 | Iwatsuki et al. ................ 364/424.1 |
| 4,989,477 | 2/1991 | Hunter et al. ....................... 74/866 |

FOREIGN PATENT DOCUMENTS 57-37140 3/1982 Japan .
62-83541 4/1987 Japan .
62-165050 7/1987 Japan .

Primary Examiner—Parshotam S. Lall
Assistant Examiner—Collin W. Park
Attorney, Agent, or Firm—Oblon, Spivak, McClelland, Maier & Neustadt

[57] ABSTRACT

A shift control system for an automatic transmission including a first transmission assembly for changing gear ratios in accordance with the release or engagement of a first frictional engagement system and a second transmission assembly connected in series to the first transmission assembly for changing gear ratios in accordance with the engagement or release of a second frictional engagement system. It includes a decision system for deciding whether or not the automatic transmission should execute the gear changes and a time lag controller for making the time lag for the second frictional engagement system to be engaged shorter than the time lag for the second frictional engagement system to be engaged for another gear change when the automatic transmission is to execute the gear changes.

13 Claims, 7 Drawing Sheets

FIG.3

| P.N | C1 | C2 | C0 | B0 | B1 | B2 | B3 | 2ND TRANSMISSION ASSEMBLY | 1ST TRANSMISSION ASSEMBLY |
|---|---|---|---|---|---|---|---|---|---|
| R |  | ○ | ○ |  |  |  | ○ | LOW | RW |
| 1 | ○ |  | ○ |  |  |  | × | LOW | 1ST SPEED |
| 2 | ○ |  |  | ○ |  |  | × | HIGH | 1ST SPEED |
| 3 | ○ |  | ○ |  | × | ○ |  | LOW | 2ND SPEED |
| 4 | ○ |  |  | ○ | × | ○ |  | HIGH | 2ND SPEED |
| 5 | ○ | ○ | ○ |  |  | ○ |  | LOW | 3RD SPEED |
| 6 | ○ | ○ |  | ○ |  | ○ |  | HIGH | 3RD SPEED |

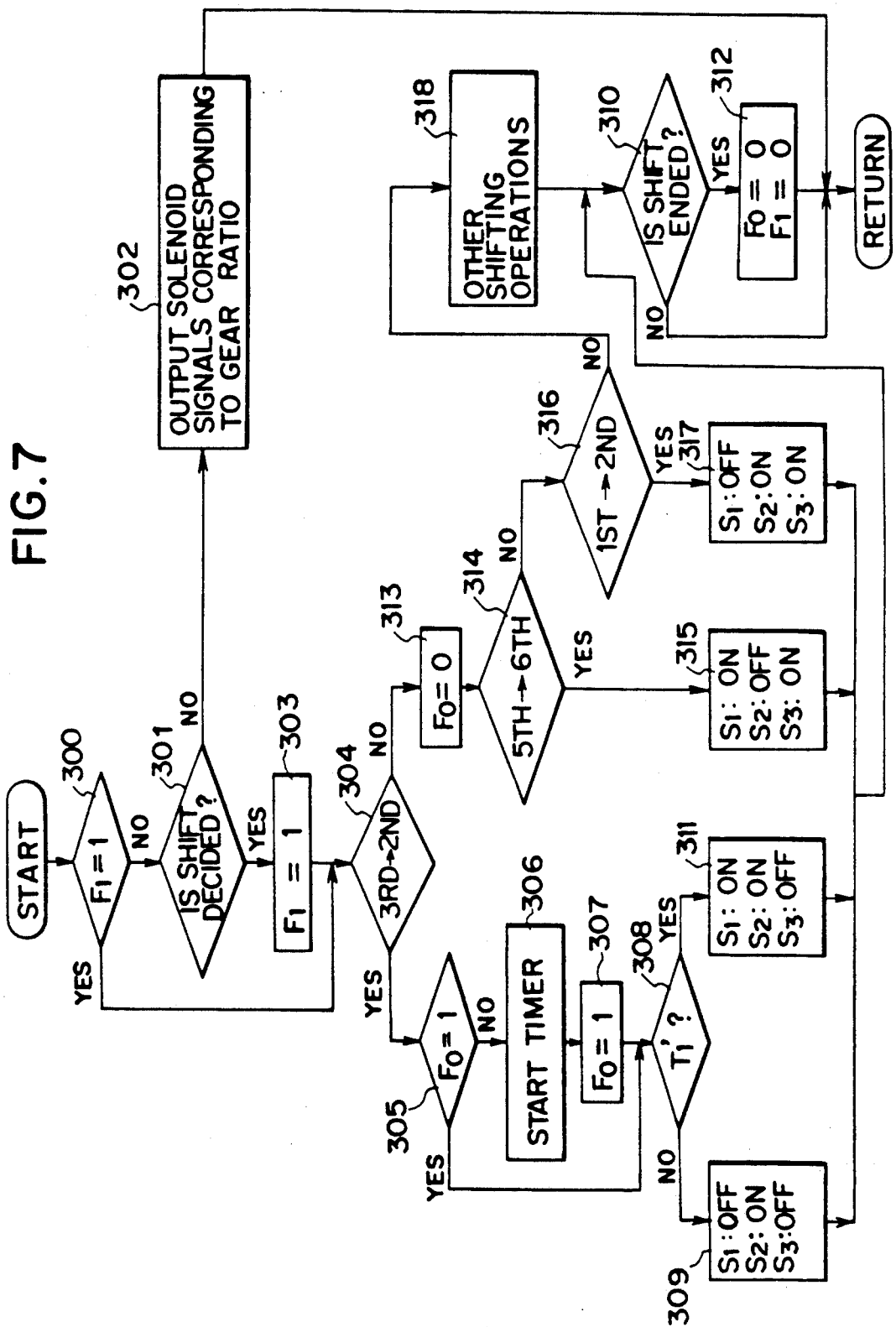

SHIFT CONTROL SYSTEM AND METHOD FOR AUTOMATIC TRANSMISSION, INCLUDING ENGAGEMENT TIME LAG CONTROL

BACKGROUND OF THE INVENTION

1. Field of the Invention

The present invention relates to a system for controlling the gear changes of a vehicular automatic transmission and a method for executing the gear changes. More specifically, the present invention relates not only to a shift control system for an automatic transmission including series-connected first and second transmission assemblies, so that a downshift of the transmission may be achieved as a whole by simultaneously accomplishing a downshift for augmenting the gear ratio at the first transmission assembly and an upshift for reducing the gear ratio at the second transmission assembly, but also to a method for executing such shifts.

2. Discussion of the Background

In accordance with the rapid spread of the vehicular automatic transmission in recent years, there has been widely adopted, with a view to improving fuel consumption, a so-called "overdrive mechanism" having a gear ratio less than "1" which is connected as a second transmission assembly in series to a first transmission assembly capable of switching gear ratios automatically in relation to the running velocity and throttle opening of the vehicle.

In Japanese Patent Laid-Open No. 57-37140, there is disclosed an automatic transmission which is constructed to achieve six forward gear ratios by synchronizing the second transmission assembly or the overdrive mechanism positively with the shift of the first transmission assembly which is capable of achieving three forward gear ratios to shift the first and second transmission assemblies simultaneously or alternately. This automatic transmission is constructed to realize multiple gear ratios easily by setting the first transmission assembly at one of first to third speeds for each of the high and low-gear ratios of the second transmission assembly. In addition, the automatic transmission can achieve a number of advantages such as improvements in the fuel consumption and running performance and reductions in the loads upon frictional engagement means.

In this automatic transmission, however, the gear changes are performed by augmenting the gear ratio at the first transmission assembly and reducing the gear ratio at the second transmission assembly in the case of a downshift from the third to second speeds or from the fifth to fourth speeds. In other words, the gear changes are achieved by shifting the first and second transmission assemblies in the opposite directions to each other. If the gear changes, i.e., the shifts at the individual transmission assemblies were individually controlled in the case of such a downshift, the shifts could not be timed to augment shifting shocks. Another disadvantage would be an extraordinary drive feel which might otherwise be invited by a phenomenon that an upshift is caused at the second transmission assembly after a downshift at the first transmission assembly or vice versa.

On the other hand, we have revealed in Japanese Patent Laid-Open No. 62-165050 that excellent shifting characteristics can be obtained by starting and completing the substantial shift of the second transmission assembly during the substantial shift of the first transmission assembly. The substantial shift, as herein termed, is the period for which rotary members have their rotational frequency changed due to the shift, and is generally called the "inertia phase". Specifically, we have revealed in our Laid-Open specification that the start of the shift at the second transmission assembly should not occur before the start of the inertia phase of the first transmission assembly and that the end of the shift at the second transmission assembly should not occur after the end of the inertia phase of the first transmission assembly.

Let the case of a shift now be examined, in which the automatic transmission is to be shifted down in its entirety by performing a downshift for augmenting the gear ratio at the first transmission assembly and an upshift for reducing the gear ratio at the second transmission assembly. In this case, a timer is used to start the inertia phase of the second transmission assembly after the start of the inertia phase of the first transmission assembly. Generally speaking, the downshift has a smaller time lag from the output of a shift command to the actual start of the shift (i.e., the inertia phase) because it is achieved by releasing the frictional engagement means, whereas the upshift has a larger time lag from the output of the shift command to the start of the inertia phase because it is achieved by engaging the frictional engagement means. Thus, the timer is used for reflecting those time differences upon the shift controls. In case such a timer is used, the shift control system is constructed to output the upshift command having the larger time lag for the second transmission assembly and then outputs the downshift command for the first transmission assembly after a predetermined constant time has been counted by the timer. As a result, the inertia phase of the upshift of the second transmission assembly is started immediately after the inertia phase of the downshift of the first transmission assembly has been actually started.

In respect to the synchronous controls using such a timer, there has been disclosed in Japanese Patent Laid-Open No. 62-83541 a technology which enables more accurate synchronous controls to be accomplished by correcting the timings of the shift commands for the first and second transmission assemblies on the basis of the shift results performed beforehand.

In the systems disclosed in the above-specified Japanese Patent Laid-Open Nos. 62-165050 and 62-83541, the frictional engagement means of the second transmission assembly has a large time lag for its engagement so that the shift command is outputted too early to the second transmission assembly which should have its substantial shift started later. As a result, the output timing of the shift command to the first transmission assembly must be delayed due to the elongated time lag at the second transmission assembly. This raises a problem in that the time period for the shift to be completely ended from the decision of the shift of the automatic transmission is elongated because of the larger time lag at the second transmission assembly.

In order to solve these problems, it may be conceived to shorten the time lag by raising the oil pressure to be supplied to the frictional engagement means. With such a concept, however, the mere rise of the engagement oil pressure of the frictional engagement means of the second transmission assembly would cause another problem in that the shift shocks are augmented by the excessively fast engagement of the frictional engagement means in case the shift is to be achieved solely by the second transmission assembly.

SUMMARY OF THE INVENTION

Accordingly, one object of the present invention is to provide both a novel shift control system, which is constructed to accelerate a gear change in the direction identical as a whole to that of the first transmission assembly by shifting the first and second transmission assemblies in the opposite directions to each other and to prevent the shift shocks of another gear change from being deteriorated, and a shift control method therefor.

Another object of the present invention is to provide both a shift control system, which is constructed to accelerate a gear change by shortening the time lag of a shift at the second transmission assembly in case the automatic transmission is shifted in the direction identical as a whole to that of the shift direction of the first transmission assembly by releasing the frictional engagement means of the first transmission assembly and engaging the frictional engagement means of the second transmission assembly to shift the individual transmission assemblies in opposite directions to each other, and a shift control method therefor.

According to the present invention, the above-specified objects can be achieved by providing time lag control means for making the time lag at the time of engaging the frictional engagement means of the second transmission assembly shorter than the time lag at the time of a gear change other than that which is caused by releasing the frictional engagement means of the first transmission assembly and by engaging the frictional engagement means of the second transmission assembly.

The above and further objects and novel features of the present invention will more fully appear from the following detailed description when the same is read in connection with the accompanying drawings. It is to be expressly understood, however, that the drawings are for the purpose of illustrations only and is not intended as a definition of the limits of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 presents a chart showing the engaged and released states of frictional engagement means for setting the individual gear ratios at the automatic transmission shown in FIG. 2;

FIG. 7 is a flow chart showing one example of control procedures.

DETAILED DESCRIPTION OF THE PREFERRED EMBODIMENTS

Figure 1:
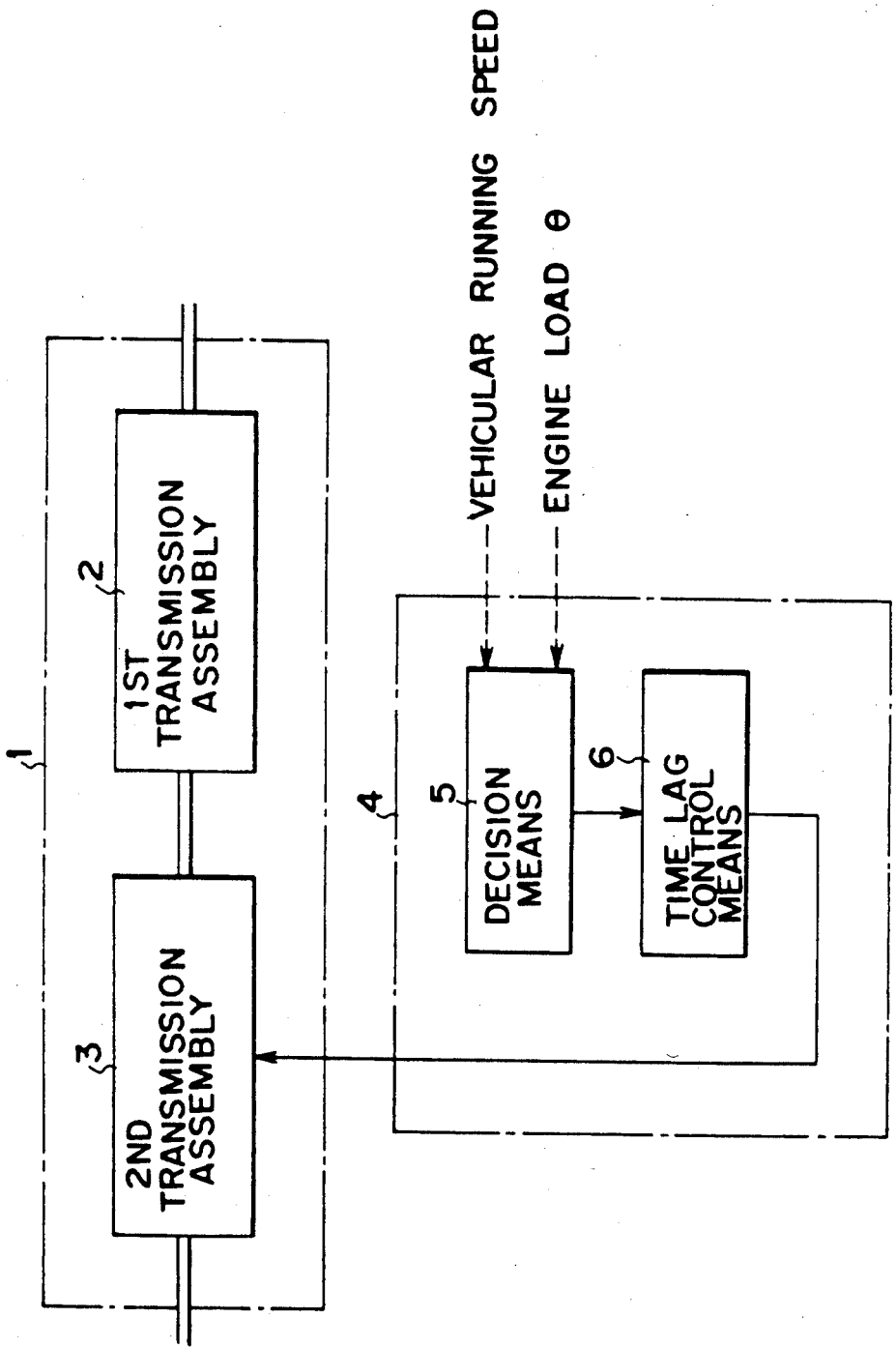
FIG. 1 is a block diagram showing the gist of the present invention.

Referring now to the drawings, wherein like reference numerals designate identical or corresponding parts throughout the several views, and more particularly to FIG. 1 thereof, where a basic structure of the present invention is detailed. In FIG. 1, an automatic transmission 1 is composed of a first transmission assembly 2 having gear ratios of relatively wide intervals and a second transmission assembly 3 having gear ratios of relatively close intervals. These transmission assemblies 2 and 3 are constructed to have their gear ratios changed, respectively, by engaging or releasing frictional engagement means and are connected in series to each other. On the other hand, a transmission control unit 4 is equipped with decision means 5 for deciding the gear ratio on the basis of a vehicular running velocity V, an engine load $\theta$ and other signals, and time lag control means 6. This time lag control means 6 is constructed to output a signal for shortening the time lag to the second transmission assembly 3, in case it is decided by the decision means 5 to effect a gear change for augmenting the gear ratio as a whole partly by releasing the frictional engagement means at the aforementioned first transmission assembly 2 to augment the gear ratio and partly by engaging the frictional engagement means at the second transmission assembly 3 to reduce the gear ratio. Specifically, this operation for shortening the time lag is either to raise an oil pressure for engaging the frictional engagement means at the second transmission unit 3 or to increase the supply of the oil and is performed by raising the oil pressure to be regulated or by reducing the resistance to the oil passage.

Figure 2:
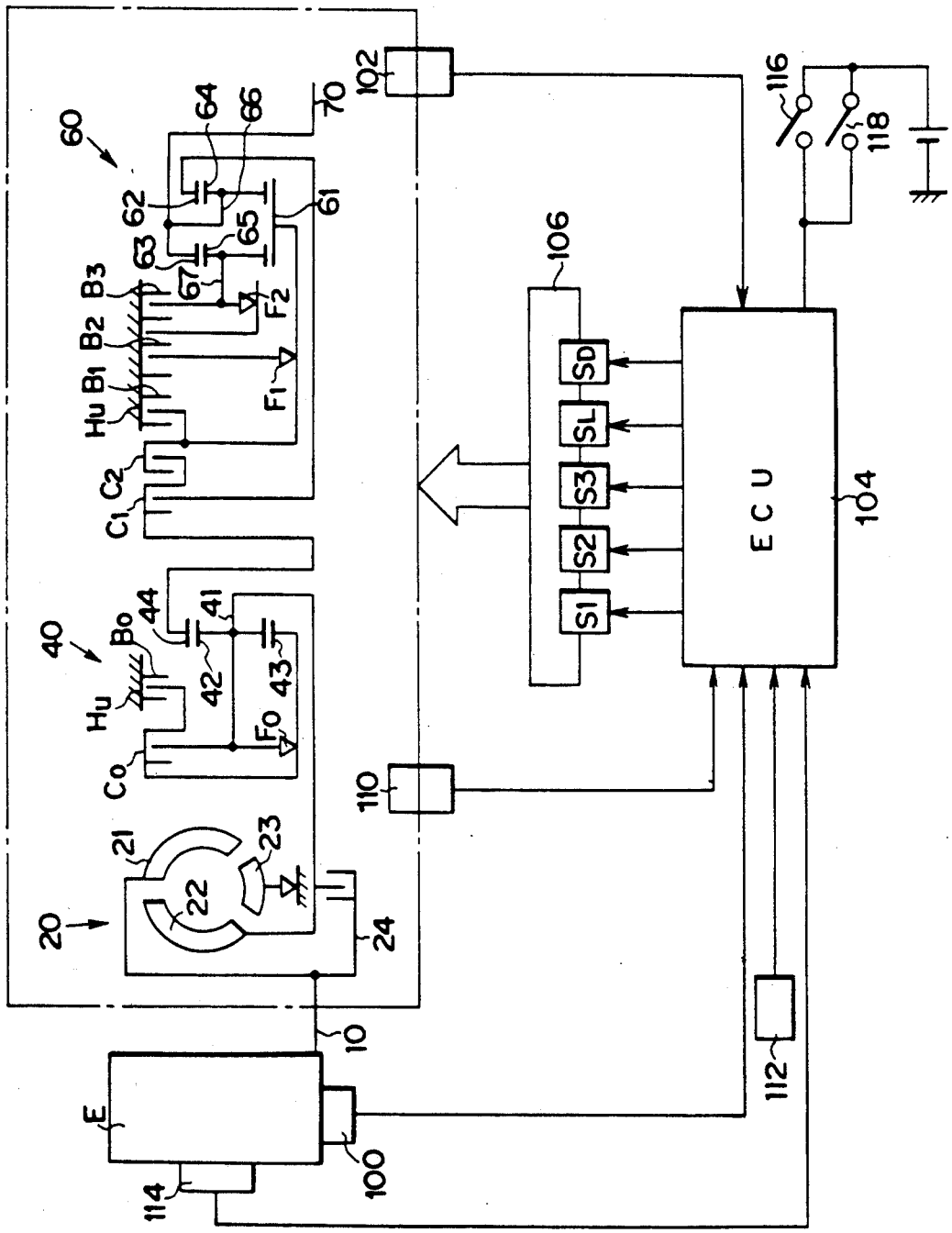
FIG. 2 is a skeleton diagram showing an automatic transmission according to an embodiment of the present invention.

A more specified structure is of the present invention shown in FIG. 2. The automatic transmission, as shown, is equipped at its shift mechanism with a torque converter 20, a second transmission assembly 40 and a first transmission assembly 60 for effecting three-forward and one-reverse gear changes.

The torque converter 20 is equipped with a pump impeller 21, a turbine runner 22, a stator 23 and a lockup clutch 24. The pump impeller 21 is connected to the crankshaft 10 of an engine E, and the turbine runner 22 is connected to the carrier 41 of a planetary gear set in the second transmission assembly 40.

In this second transmission assembly 40, a pinion gear 42 held rotatably by the carrier 41 meshes with a sun gear 43 and a ring gear 44. Moreover, a clutch CO and a one-way clutch FO are interposed between the sun gear 43 and the carrier 41, and a brake BO is interposed between the sun gear 43 and a housing Hu.

The first transmission assembly 60 is equipped with two front and rear planetary gear sets. These planetary gear sets share a sun gear 61 and are equipped, respectively, with pinion gears 64 and 65 for meshing with the common sun gear 61, carriers 66 and 67 for holding the pinion gears 64 and 65, and ring gears 62 and 63 for meshing with the pinion gears 64 and 65.

The ring gear 44 of the second transmission assembly 40 is connected through a clutch C1 to the aforementioned ring gear 62. Another clutch C2 is interposed between the ring gear 44 and the sun gear 61. Moreover, the aforementioned carrier 66 and ring gear 63 are connected to each other and together to an output shaft 70. Between the aforementioned carrier 67 and housing Hu, on the other hand, there are interposed a brake B3 and a one-way clutch F2. Moreover, a brake B2 is interposed through another one-way clutch F1 between the sun gear 61 and the housing Hu, and a brake B1 is interposed between the sun gear 61 and the housing Hu.

Figure 4:
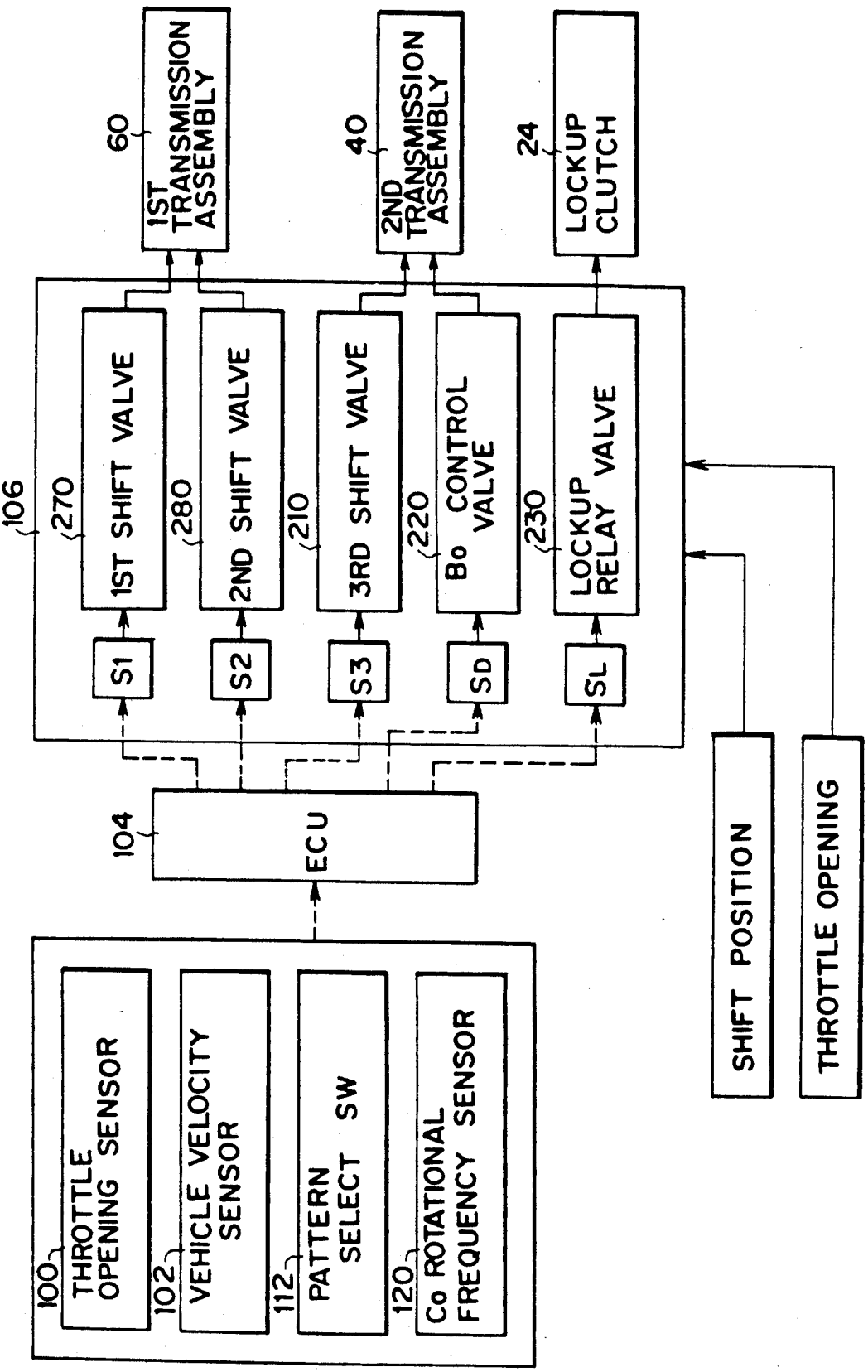
FIG. 4 is a block diagram for explaining the transmission systems of control signals of the automatic transmission shown in FIG. 2.

The automatic transmission is equipped with the shift mechanism thus far described and has its individual clutches and brakes engaged and/or released, as presented in column B in FIG. 3, to perform the shift control. This shift control is effected by controlling solenoid valves S1 to S3, SL and SD in an oil pressure control circuit 106 in accordance with a preset shift pattern, by means of an electronical control unit (ECU) 104 which is made receptive to the signals of a throttle opening sensor 100 for detecting a throttle opening representative of a load state of the engine E and a vehicular velocity sensor 102 for detecting the running velocity of the vehicle, as shown in FIG. 4. In the clutch and brake application chart of FIG. 3: symbols O indicate the engaged state; symbols X indicate the engaged state to be taken only at the time of engine braking; and blanks indicate the released state.

In an automatic transmission of this type, as can be apparently seen from the column A in FIG. 3, at the time of a downshift from 3rd to 2nd speeds or from fifth to fourth speeds, the gear ratio at the second transmission assembly 40 is reduced whereas the gear ratio at the first transmission assembly 60 is increased so that the automatic transmission may be shifted down in its entirety. Hence, these gear changes will correspond to those for reducing the time lag at the time of engagement of the brake BO or the frictional engagement means of the second transmission assembly 40, which forms the subject of the present invention.

The aforementioned solenoid valves S1 and S2 control the first and second shift valves 270 and 280, respectively, of the first transmission assembly 60, as shown in FIG. 4. The solenoid valve S3 controls a third shift valve 210 for shifting the second transmission assembly 40 from high to low gears. On the other hand, the solenoid valve SL controls a lockup relay valve 230. Moreover, the linear solenoid valve SD controls oil pressures arbitrarily for the brake BO and others.

Incidentally, the specific structures and operations of the individual devices themselves in the oil pressure control circuit are not especially different from those of the prior art.

In FIGS. 2 or 4, reference numeral 110 designates a shift position sensor for detecting such positions including the neutral range (N), the drive range (D) or the reverse range (R), as is selected by the driver. Numeral 112 designates a pattern select switch for selecting one of the shift patterns including the economy mode (E) and the power mode (P). Moreover, numeral 114 designates a water temperature sensor for detecting the temperature of the cooling water of the engine E. Numeral 116 designates a brake switch for detecting the depression of the foot brake. Numeral 118 designates a brake switch for detecting the pull of the side brake. Still moreover, numeral 120 appearing in FIG. 4 designates a CO rotational frequency sensor for detecting the r.p.m. of the clutch CO. As shown in FIG. 4, on the other hand, the oil pressure in the oil pressure control circuit 106 is changed in dependence upon the shift position and the throttle opening.

Figure 5:
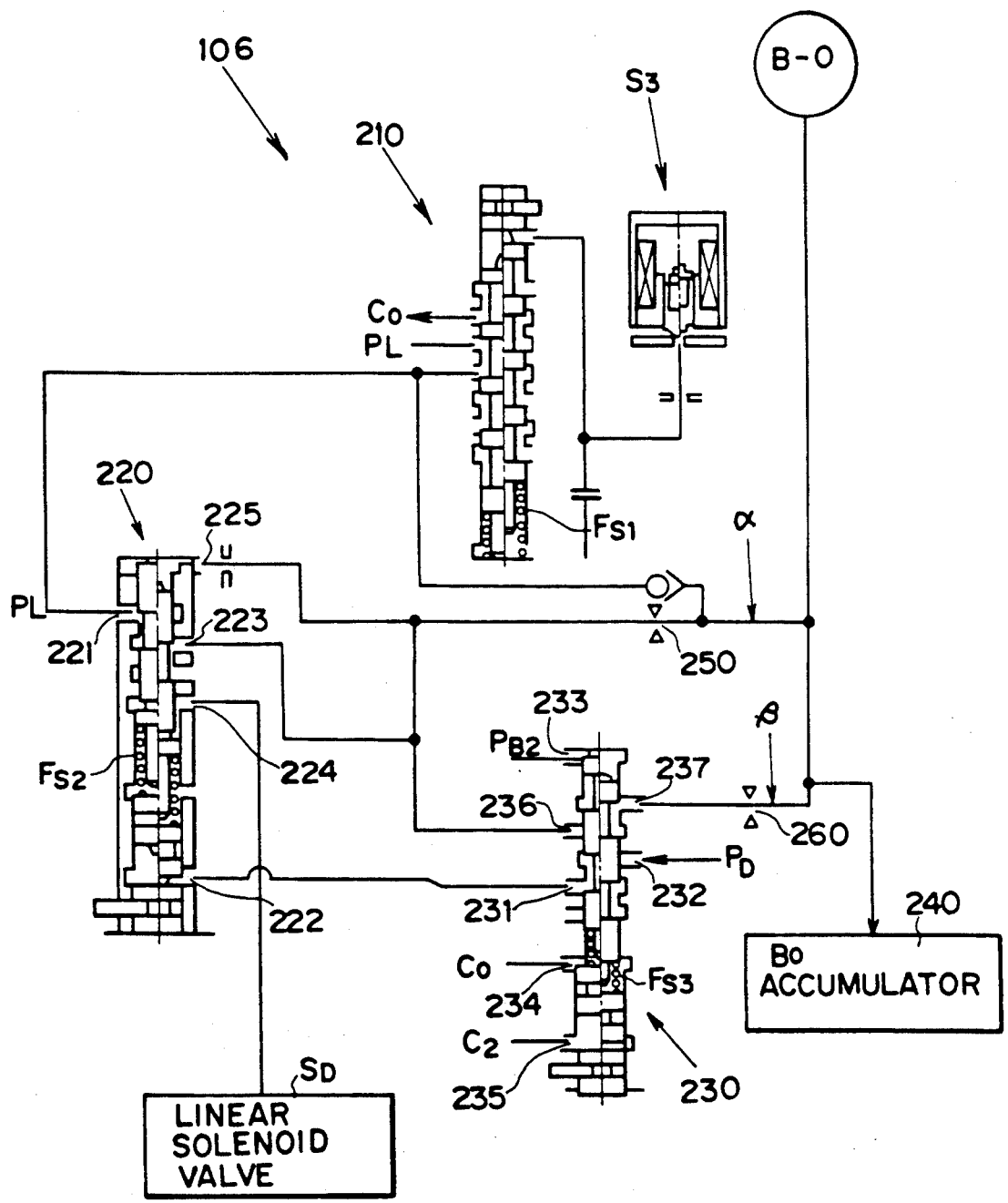
FIG. 5 is an oil pressure circuit diagram showing an essential portion of an oil pressure control circuit in the automatic transmission shown in FIG. 2.

FIG. 5 shows an essential portion of the oil pressure control circuit 106.

In FIG. 5 reference numeral 210 designates a third shift valve; numeral 220 designates a BO control valve; numeral 230 a relay valve; numeral 240 an accumulator; numeral 250 a small orifice; and numeral 260 a large orifice.

The third shift valve 210 is controlled by the solenoid valve S3 to switch the supply and discharge of the oil pressure to and from the brake BO and the clutch CO. Incidentally, reference character Fs1 designates a spring.

The BO control valve 220 comes into a state indicated at the left-hand side of FIG. 5, when a D-range pressure PD to be established by setting the shift lever in the D-range is applied to a port 222 of the BO control valve 220 as a communication is provided between ports 231 and 232 of the relay valve 230. In this state, a line pressure PL applied to a port 221 is supplied directly to a port 223. When, on the other hand, the D-range pressure PD of the port 222 is drained to bring the control valve 220 into a state indicated at the right-hand side of FIG. 5, the line pressure PL applied to the port 221 is modulated by both the oil pressure supplied from the linear solenoid valve SD to a port 224 and the elastic force of a spring Fs2, until this modulated oil pressure is outputted from the port 223.

The aforementioned relay valve 230 is operated to establish or block the communication between the ports 231 and 232 by the balance among the oil pressure of the brake B2 to be applied to a port 233, the oil pressure of the clutch CO to be applied to a port 234, the oil pressure of the clutch C2 to be applied to a port 235, and the elastic force of a spring Fs3.

Moreover, the relay valve 230 is constructed to augment the supply of the oil to the brake BO only when the automatic transmission is shifted down from the third to second speeds.

Next, the operations of the control system thus constructed will be described with reference to FIGS. 5 and 6.

Figure 6:
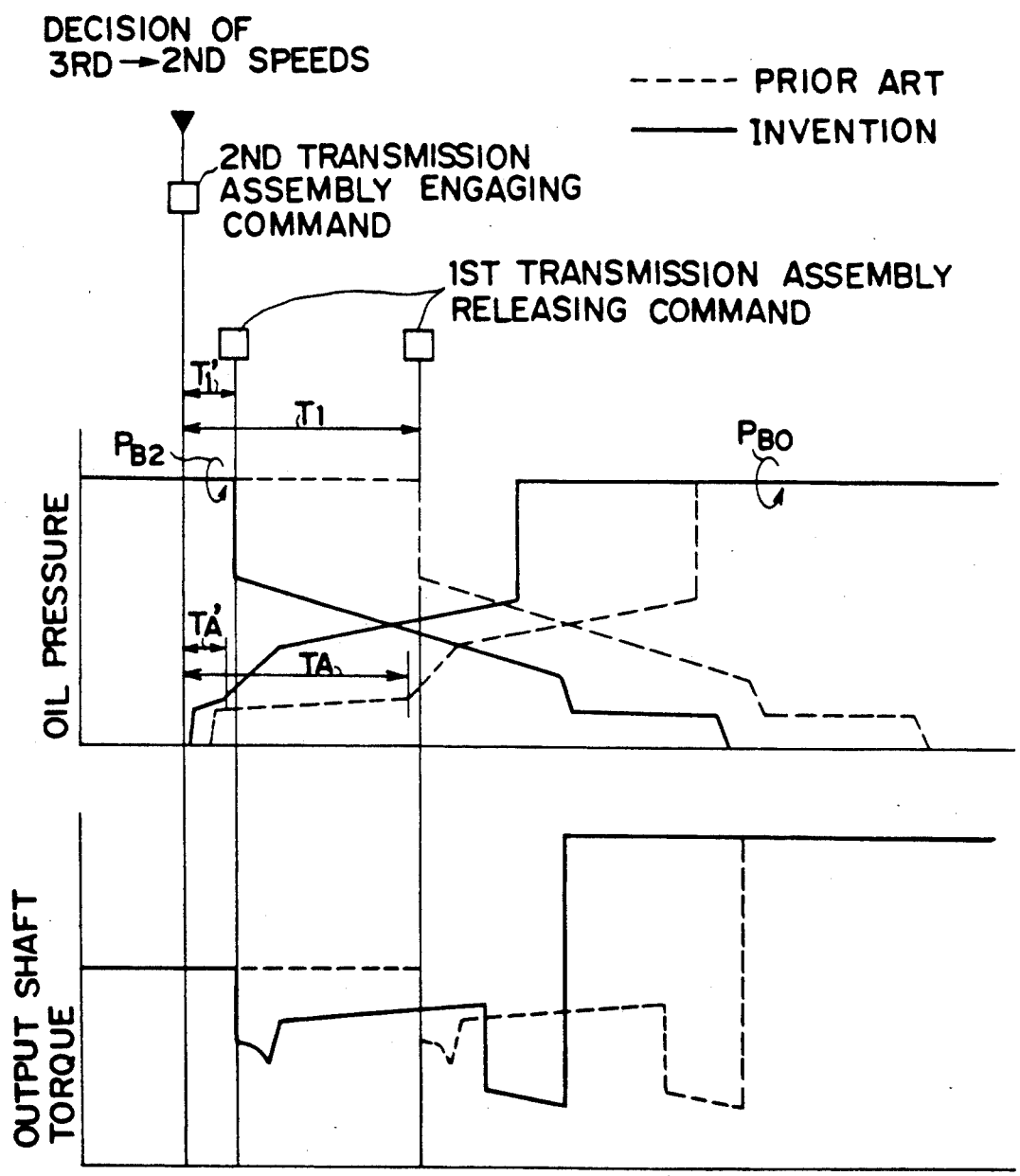
FIG. 6 is a diagram showing the shift transit characteristics of the embodiment of the present invention.

Simultaneously with a gear change from the third to second speeds being decided, as shown in FIG. 6, there is outputted a command signal for shifting the second transmission assembly 40 to a high gear with a small ratio. Then, the solenoid valve S1 and the solenoid valve S3 are turned OFF, but the solenoid valve S2 is turned ON. Moreover, the linear solenoid valve SD is controlled to have its output pressure dropped to the minimum (0 Kgf/cm$^2$).

In this state, the oil pressures in the clutches C2 and CO, i.e., the oil pressures at the ports 235 and 234 of the relay valve 230, as shown in FIG. 5, are not established, but only the oil pressure of the brake B2 is applied to the port 233 so that the relay valve 230 takes the state indicated at the right-hand side of FIG. 5 to provide the communication between the ports 236 and 237. On the other hand, the BO control valve 220 takes the state indicated at the right-hand side of FIG. 5, because no oil pressure is applied to the port 222, to provide the communication between the ports 221 and 223. As a result, the oil passage for supplying the brake BO with the oil pressure is divided into two lines, as indicated at α and β in FIG. 5, so that the resistance to the oil passage for the brake BO is reduced.

By minimizing the output pressure of the linear solenoid valve SD, moreover, the output pressure of the BO control valve 220 can be maximized so that the oil supply to the brake BO can be effected not only with a small resistance but also under a high supply pressure. This results in a shortening of the time lag from the output of the signal for engaging the brake BO to the actual achievement of the engagement. This shortening is indicated in FIG. 6 by the change in the time lag from TA to TA'.

After the lapse of a time period T' counted by the timer from the decision of the gear change from the third to second speeds, a command signal for a downshift to augment the gear ratio of the first transmission assembly 60 is outputted to turn ON the solenoid valve S1 and the solenoid valve S2 and to turn OFF the solenoid valve S3 so that the oil pressure PB2 of the brake B2 to be applied to the port 233 of FIG. 5 is drained. As a result, the relay valve 230 takes the state indicated at the left-hand side of FIG. 5 to block the communication between the ports 236 and 237 and provide the communication between the ports 231 and 232. Thus, the oil passage β equipped with the larger orifice 260 is closed so that the oil pressure is supplied to the brake BO only via the oil passage α equipped with the smaller orifice 250. In this state, moreover, the D-range pressure PD is inputted to the port 222 of the BO control valve 220 so that the BO control valve 220 takes the state indicated at the left-hand side of FIG. 5 to provide the communication between the ports 221 and 223 at all times. In other words, the BO control valve 220 does not perform its pressure modulation.

After the lapse of the time period T1' counted by the timer from the shift decision from the third to second speeds, the line pressure PL is supplied to the brake BO from the oil passage only. As a result, the resistance to the oil passage is increased to raise the oil pressure of the brake BO remarkably and gently with the aid of the function of the BO accumulator 240, thus reducing the shocks which might otherwise be caused by shifting the second transmission assembly 40 to the high gear.

Here, the gear changes for shifting the brake BO from the released state to the engaged state are of two kinds, i.e., the change from the first to second speeds and the change from the fifth to sixth speeds, in addition to the aforementioned change from the third to second speeds. In either of the additional gear changes from the first to second speeds and from the fifth to sixth speeds, the brake BO is supplied with the oil pressure only via the aforementioned oil passage α.

Let the case now be considered, in which the gear is to be changed from the first to second speeds. In the relay valve 230, the oil pressures of the brake B2 for the port 233, of the clutch CO for the port 234 and of the clutch C2 for the port 235 are drained to bring the relay valve 230 to the state indicated at the left-hand side of FIG. 5 so that the oil supply line for the brake BO is the oil passage only. In case the gear is to be changed from the fifth to sixth speeds, on the other hand, the oil pressure of the brake B2 is applied to the port 233 whereas the oil pressure of the clutch CO for the port 234 is drained, and the oil pressure of the clutch C2 is applied to the port 235, so that the relay valve 230 takes the state indicated at the left-hand side of FIG. 5 like the aforementioned case. As a result, the oil supply line to the brake BO is the oil passage only. In these gear changing cases, therefore, the oil pressure is supplied to the brake BO via the oil passage α having a larger resistance, and the BO accumulator 240 operates to engage the brake BO at a preset low rate, thus reducing the shifting shocks.

The operations thus far described are illustrated in a flow chart in FIG. 7. In FIG. 7, a flag F1 indicates whether or not a shift decision has been performed, and has an initial value "0". Hence, the decision result at Step 300 is "NO" at first, and the procedure advances to Step 301. The shift decision is not performed without any change in the vehicular running velocity or the engine load. In this case, the decision result at Step 301 is "NO", and the procedure advances to Step 302 to output a solenoid signal according to each gear ratio. After this, the procedure advances to RETURN. In the case of a shift decision, the result of Step 301 is "YES", and the procedure advances to Step 303 to set the flag F1 at "1". After this, it is decided at Step 304 whether or not the shift is from the third to second speeds. In case the decision result at Step 304 is "YES", the procedure advances to Step 305 to decide whether or not a flag FO indicating the start of the timer is at "1". Since this flag FO is also reset at "0" at first, the first decision result of Step 305 is "NO". In this case, the procedure advances to Step 306, at which point the timer is started, and the flag FO is set at "1" at Step 307. It is then decided at Step 308 whether or not the counted value of the timer is at the predetermined value T1'. If the decision result is "NO", the procedure advances to Step 309 to turn OFF the solenoid valves S1 and S3 and to turn ON the solenoid valve S2. As a result, the oil pressure for the brake BO is raised, and the resistance to the oil passage is dropped, as has been described hereinbefore, so that the time lag for engaging the brake BO is shortened. At subsequent Step 310, it is decided whether or not the gear shift has ended. This decision result is "NO" until the counted value of the timer has not reached T1', and the procedure advances to RETURN.

When Step 300 is reached by way of the procedure thus far described, the decision result of Step 300 is "YES" so that the procedure advances to Step 304. Since, however, the gear change from the third to second speeds has not ended, the decision result of Step 304 is "YES". Since, moreover, the flag FO is set at "1", the decision result at Step 305 is "YES". Then, it is immediately decided at Step 308 whether or not the counted value of the timer is at T1'. In case the decision result is "YES", the procedure advances to Step 311, at which point the solenoid valves S1 and S2 are turned ON whereas the solenoid valve S3 is turned OFF. As a result, the supply oil pressure for the brake BO is dropped to an ordinary level, as has been described hereinbefore, and the resistance to the oil passage is increased so that the time lag of the engagement of the brake BO is returned to such an ordinary duration as to keep the shifting shocks away from any deterioration. If the gear change is thus ended, the decision result at Step 310 is "YES", and the procedure advances to RETURN after the individual flags FO and F1 are reset to "0" at Step 312. If the gear change has not ended, the procedure advances to RETURN without any zero-resetting of the flags FO and F1.

In case, on the other hand, a shift is decided but not for that from the third to second speeds, the decision result of Step 304 is "NO", and the procedure advances to Step 313, at which point the flag FO is reset at "0". After this, it is decided at Step 314 whether or not the shift is that from the fifth to sixth speeds. In case the decision result is "YES", the procedure advances to Step 315 to turn ON the solenoid valves S1 and S3 and to turn OFF the solenoid valve S2. In case, on the other hand, the decision result of Step 314 is "NO", the procedure advances to Step 316, at which point it is decided whether or not the shift is that from the first to second speeds. If this decision result is "YES", the solenoid valve S1 is turned OFF whereas the solenoid valves S2 and S3 are turned ON at Step 317. Thanks to the controls of the individual solenoid valves S1, S2 and S3 at those Steps 315 and 317, the oil supply pressure for the brake BO is set at the ordinary level, as has been described hereinbefore, while increasing the resistance to the oil passage. If, moreover, the decision result at Step 316 is "NO", other predetermined shifting operations are carried out at Step 318. After any of the operations of Steps 315, 317 and 318, moreover, the procedure advances to Step 310 to decide the end of the shift and further to RETURN after the processing of Step 312 or without the processing of Step 312.

According to the embodiment thus far described, the time lag at the time of transition of engagement of the brake BO can be shortened from TA to TA' at the shift from the third to second speeds so that the downshift of the first transmission assembly 60 can be carried out promptly. In other words, the timer can be shortened from T1 to T1'.

After, moreover, the timer has counted the predetermined time T1', the oil passages are restricted from the two lines α and β to one line α so that the high-gear shift of the second transmission assembly 40 can be realized without any deterioration in its characteristics.

Of the shifts for shifting the brake BO into the engaged state, those from the first to second speeds and from the fifth to sixth speeds other than that from the third to second speeds can be freed from having their characteristics deteriorated.

The advantages obtainable from the present invention will now be synthetically described. The gear change for achieving a shift in the direction identical as a whole to that of the first transmission assembly can be realized with a short time lag but without any deterioration in the shifting characteristics, by simultaneously performing the shift resulting from the release of the frictional engagement means of the first transmission assembly and the shift in the opposite direction to that of the first transmission assembly as a result of the engagement of the frictional engagement means of the second transmission assembly. Another advantage is that the shifting characteristics other than the aforementioned ones can be kept away from any deterioration.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A shift control system for an automatic transmission comprising:
   a first transmission assembly comprising means for changing gear ratios therein in accordance with a release or engagement of a first frictional engagement means;
   a second transmission assembly connected in series to said first transmission assembly and comprising means for changing gear ratios therein in accordance with an engagement or release of a second frictional engagement means such that intervals of said gear ratios of said second transmission assembly are narrower than those of the gear ratios of said first transmission assembly, so that a change in the gear ratios of said first transmission assembly by the release of said first frictional engagement means and a change in the gear ratios of said second transmission assembly in an opposite direction to that of said first transmission assembly by the engagement of said second frictional engagement means are simultaneously accomplished to execute a predetermined shift in which the gear ratio of the transmission as a whole is changed in a direction identical to said change in the gear ratios of said first transmission assembly;
   decision means for deciding whether or not said automatic transmission should execute said predetermined shift and for commanding said second transmission assembly to begin changing gear ratios therein, wherein there exists a time lag between the command for said second frictional engagement means to begin changing gear ratios and the engagement of said second frictional engagement means; and
   time lag control means for making a time lag for said second frictional engagement means to be engaged shorter for said predetermined shift than a time lag for said second frictional engagement means to be engaged for another gear change when said automatic transmission is to execute said gear changes.

2. A shift control system for an automatic transmission according to claim 1,
   including pressure control means for boosting the oil pressure to be supplied to said second frictional engagement means, wherein said pressure control means comprises:
   a linear solenoid valve; and
   an oil pressure control valve to use as one pilot pressure of the pressure to be supplied from said linear solenoid valve.

3. A shift control system for an automatic transmission according to claim 2, further comprising:
   an electronic control means for controlling said linear solenoid valve.

4. A shift control system for an automatic transmission according to claim 1,
   wherein said second frictional engagement means is connected to at least two oil passages for supplying oil pressures therethrough, said oil passages being equipped with orifices having different opening areas, and
   wherein said time lag control means includes a control valve for opening or closing one of said oil passages.

5. A shift control system for an automatic transmission according to claim 4,
   wherein said control valve opens or closes the oil passage equipped with the orifice having a larger opening area.

6. A shift control system for an automatic transmission according to claim 1,
   wherein said gear changes are executed by both an increase of the gear ratio of said first transmission assembly, which is caused by releasing said first frictional engagement means, and a reduction of the gear ratio of said second transmission assembly, which is caused by engaging said second frictional engagement means.

7. A shift control system for an automatic transmission according to claim 1,
   wherein said second transmission assembly includes a planetary gear set having a sun gear as a control element, a planetary carrier as an input element and a ring gear as an output element, and wherein said second frictional engagement means includes a brake for stopping revolutions of said sun gear selectively.

8. A shift control method for an automatic transmission, wherein said automatic transmission includes a first transmission assembly for changing gear ratios therein in accordance with a release or engagement of a first frictional engagement means and a second transmission assembly connected in series to said first transmission assembly for changing gear ratios therein in accordance with an engagement or release of a second frictional engagement means such that intervals of said gear ratios of said second transmission assembly are narrower than those of the gear ratios of said first transmission assembly, comprising the steps of:
controlling a predetermined shift of the transmission as a whole in a direction identical to that of said first transmission assembly by simultaneously accomplishing a change in the gear ratio of said first transmission assembly by the release of said first frictional engagement means and a change in the gear ratio of said second transmission assembly in the opposite direction to that of said first transmission assembly by the engagement of said second frictional engagement means;
shortening a time lag for engagement of said second frictional engagement means relative to an output of an engagement signal for engaging said second frictional engagement means in said predetermined shift as compared to another shift; and
outputting a release signal for releasing said first frictional engagement means after a lapse of a predetermined time from the output of said engagement signal.

9. A shift control method for an automatic transmission according to claim 8,
wherein the shortening of said time lag is further carried out by reducing a resistance to an oil passage for supplying an oil pressure therethrough to said second frictional engagement means.

10. A shift control system for an automatic transmission comprising:
a first transmission assembly comprising means for changing gear ratios therein in accordance with a release or engagement of a first frictional engagement means;
a second transmission assembly connected in series to said first transmission assembly and comprising means for changing gear ratios therein in accordance with an engagement or release of a second frictional engagement means such that intervals of said gear ratios of said second transmission assembly are narrower than those of the gear ratios of said first transmission assembly, so that a change in the gear ratios of said first transmission assembly by the release of said first frictional engagement means and a change in the gear ratios of said second transmission assembly in an opposite direction to that of said first transmission assembly by the engagement of said second frictional engagement means are simultaneously accomplished to execute a predetermined shift of the transmission as a whole in a direction identical to said change in the gear ratios of said first transmission assembly;
decision means for deciding whether or not said automatic transmission should execute said predetermined shift and for commanding said second transmission assembly to being changing gear ratios therein, wherein there exists a time lag between the command for said second frictional engagement means to begin changing gear ratios and the engagement of said second frictional engagement means; and
time lag control means for making a time lag for said second frictional engagement means to be engaged shorter for said predetermined shift than a time lag for said second frictional engagement means to be engaged for another gear change when said automatic transmission is to execute said gear changes,
wherein said frictional engagement means is engaged by an oil pressure, and wherein said time lag control means includes pressure control means for boosting the oil pressure to be supplied to said second frictional engagement means.

11. A shift control system for an automatic transmission according to claim 10,
wherein said second frictional engagement means is connected to at least two oil passages for supplying oil pressures therethrough, said oil passages being equipped with orifices having different opening areas, and
wherein said time lag control means includes a control valve for opening or closing one of said oil passages.

12. A shift control method for an automatic transmission, wherein said automatic transmission includes a first transmission assembly for changing gear ratios therein in accordance with a release or engagement of a first frictional engagement means and a second transmission assembly connected in series to said first transmission assembly for changing gear ratios therein in accordance with an engagement or release of a second frictional engagement means such that intervals of said gear ratios of said second transmission assembly are narrower than those of the gear ratios of said first transmission assembly, comprising the steps of:
controlling a predetermined shift of the transmission as a whole in a direction identical to that of said first transmission assembly by simultaneously accomplishing a change in the gear ratio of said first transmission assembly by the release of said first frictional engagement means and a change in the gear ratio of said second transmission assembly in the opposite direction to that of said first transmission assembly by the engagement of said second frictional engagement means;
shortening a time lag for engagement of said second frictional engagement means relative to an output of an engagement signal for engaging said second frictional engagement means in said predetermined shift as compared to another shift; and
outputting a release signal for releasing said first frictional engagement means after a lapse of a predetermined time from the output of said engagement signal,
wherein the shortening of said time lag is carried out by boosting an oil pressure to be supplied to said second frictional engagement means.

13. A shift control method for an automatic transmission according to claim 12,
wherein the shortening of said time lag is further carried out by reducing a resistance to an oil passage for supplying an oil pressure therethrough to said second frictional engagement means.

* * * * *